(12) United States Patent
Iio

(10) Patent No.: US 6,908,700 B2  
(45) Date of Patent: Jun. 21, 2005

(54) FUEL CELL SYSTEM FOR VEHICLE

(75) Inventor: Masatoshi Iio, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 567 days.

(21) Appl. No.: 10/153,621

(22) Filed: May 24, 2002

(65) Prior Publication Data

US 2002/0177020 A1 Nov. 28, 2002

(30) Foreign Application Priority Data

May 24, 2001 (JP) .................................. 2001-155204

(51) Int. Cl.[7] .............................................. H01M 8/04
(52) U.S. Cl. ........................... 429/17; 429/13; 429/19; 429/20; 429/24; 429/22
(58) Field of Search ............................. 429/13, 17, 19, 429/20, 22, 24

(56) References Cited

U.S. PATENT DOCUMENTS 6,098,733 A * 8/2000 Ibaraki et al. ............. 180/65.2
6,410,175 B1 * 6/2002 Tillmetz et al. ............... 429/13
6,458,478 B1 * 10/2002 Wang et al. .................. 429/17
6,622,078 B1 * 9/2003 Kuragaki et al. ............ 701/96
6,725,151 B2 * 4/2004 Itou ........................... 701/123

FOREIGN PATENT DOCUMENTS

| JP | 9-266006 | 10/1997 |
| JP | 11-329472 | 11/1999 |

* cited by examiner

Primary Examiner—Bruce F. Bell  
(74) Attorney, Agent, or Firm—McDermott Will & Emery LLP

(57) ABSTRACT

A vehicle fuel cell system according to this invention comprises a controller (20) that compares a input running distance to a predetermined distance. When the input running distance is less than the predetermined distance, the controller (20) finishes running using only the hydrogen supplied from a hydrogen storage device (14) without starting a start-up combustor (50). When the input running distance is larger than the predetermined distance, the controller (20) starts hydrogen supply from the hydrogen storage device (14), and simultaneously starts warm-up of a reformer (3) by starting the start-up combustor (50). When warm-up of the reformer (3) is complete, supply of hydrogen from the hydrogen storage device (14) finishes, and hydrogen supply from the reformer (3) starts.

8 Claims, 5 Drawing Sheets

US 6,908,700 B2

FUEL CELL SYSTEM FOR VEHICLE

FIELD OF THE INVENTION

This invention relates to a fuel cell system for vehicles.

BACKGROUND OF THE INVENTION

JP 1997-266006A published by the Japanese Patent Office in 1997 discloses a fuel cell system for vehicles comprising a reformer that produces reformate gas and a hydrogen tank that stores hydrogen gas. This hydrogen tank supplies a deficiency of hydrogen when the reformer cannot supply a required amount of hydrogen rich gas to a fuel cell stack, due to warm-up operation of the reformer or a rapid increase of load.

SUMMARY OF THE INVENTION

This fuel cell system starts the warm-up of the reformer simultaneously with the start of the vehicle, regardless of the vehicle running distance and time. Thus, the warm-up of the reformer is started even if the vehicle reaches its destination before the warm-up is completed. This useless warm-up of the reformer decreases the efficiency of the fuel cell system, and increase the fuel consumption of the vehicle.

It is therefore an object of this invention to provide a high efficiency fuel cell system that prevents an unnecessary warm-up of the reformer.

To achieve the above object, this invention provides a fuel cell system for a vehicle comprising a fuel cell that produces electricity by inducing a reaction between hydrogen and oxygen, a hydrogen generating device that generates hydrogen from liquid fuel, a warm up device that warms the hydrogen generating device when the fuel cell system is started, a hydrogen storage device that stores hydrogen, valves that selectively connects either the hydrogen generating device or the hydrogen storage device to the fuel cell, an input device that input a vehicle running distance, and a programmable controller.

The programmable controller is programmed to compare the vehicle running distance to a predetermined distance. The programmable controller is also programmed to prohibit the warm up device from warming the hydrogen generating device and to control the valves to connect the hydrogen storage device to the fuel cell if the vehicle running distance is shorter than the predetermined distance.

The details as well as other features and advantages of this invention are set forth in the remainder of the specification and are shown in the accompanying drawings.

DESCRIPTION OF THE PREFERRED EMBODIMENTS

Figure 1:
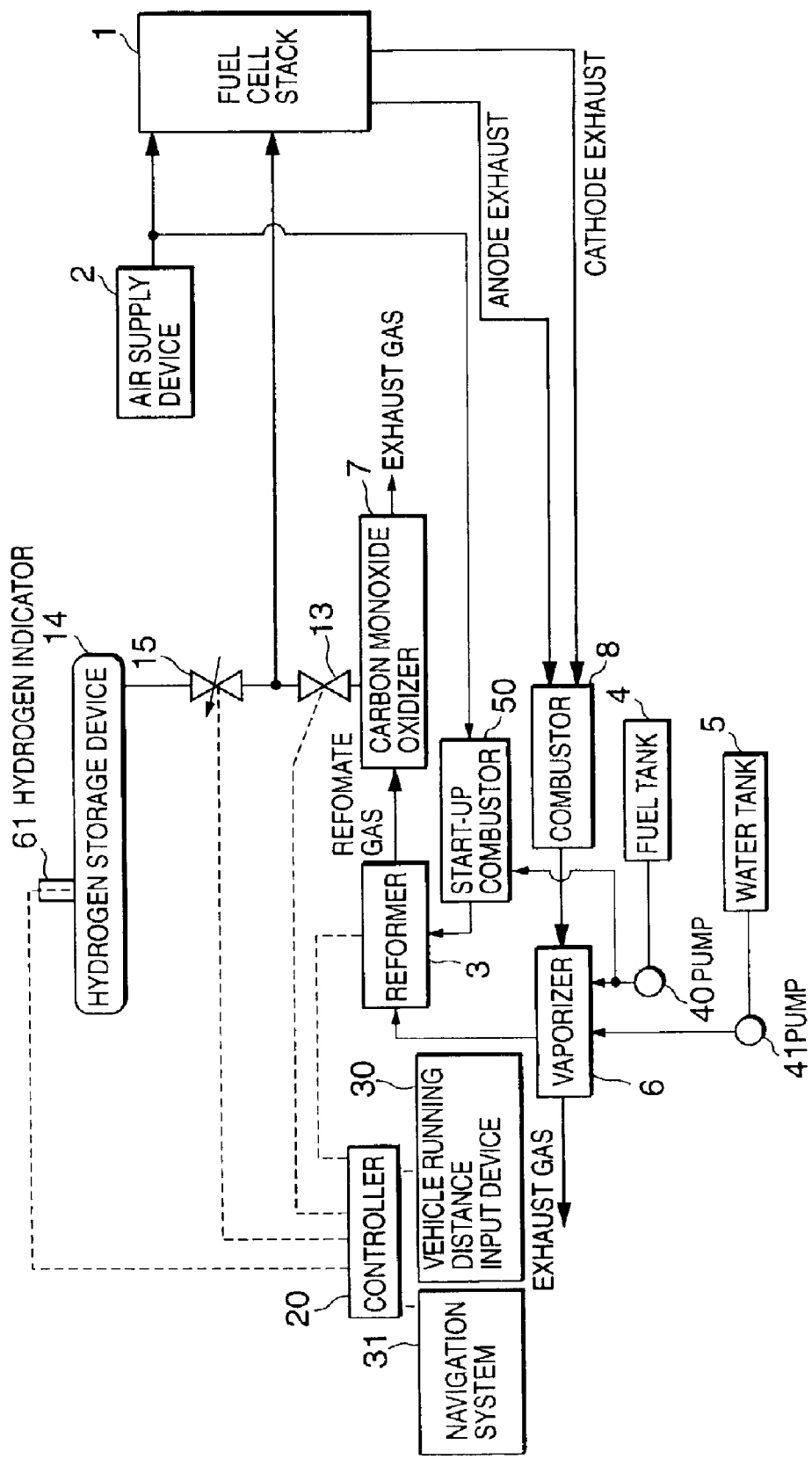
FIG. 1 is a schematic diagram of a fuel cell system for a vehicle according to this invention.

Referring to FIG. 1 of the drawings, a fuel cell system for a vehicle according to this invention comprises an air supply device 2, a fuel cell stack 1, an vaporizer 6, a combustor 8, a reformer 3, a carbon monoxide oxidizer 7, and a hydrogen storage device 14.

The air supply device 2 intakes fresh air from the atmosphere, compresses the sucked fresh air to a predetermined pressure, and supplies the compressed fresh air to a cathode electrode of the fuel cell stack 1.

On the other hand, the pump 40 supplies fuel to the vaporizer 6 from a fuel tank 4. A pump 41 supplies water to the vaporizer 6 from a water tank 5. The vaporizer 6 vaporizes the supplied fuel and water by using the heat of the combustion gas generated in the combustor 8. The reformer 3 induces the reaction between the vaporized fuel and water under conditions of catalysis to yield reformate gas. The carbon monoxide oxidizer 7 forms hydrogen rich gas by removing carbon monoxide from the reformate gas yielded by the reformer 3 and supplies the formed hydrogen rich gas to the fuel electrode of the fuel cell stack 1.

The fuel cell stack 1 generates electric power by inducing the reaction between the oxygen in the fresh air and the hydrogen in the hydrogen rich gas. Due to the reaction in the fuel cell stack 1, the cathode electrode produces cathode exhaust and an anode electrode produces anode exhaust. The combustor 8 burns the cathode exhaust and the anode exhaust to produce the combustion gas and sends the produced combustion gas to the vaporizer 6. After used to heat the fuel and water, the combustion gas is discharged into the atmosphere.

Immediately after a cold start of the fuel cell system, the reformer 3 and the carbon monoxide oxidizer 7 are too cold to induce the catalytic reaction. Therefore, the fuel cell system warms up the reformer 3 and the carbon monoxide oxidizer 7 until their temperatures reach predetermined temperature. To perform this warm up, the fuel cell system comprises a stat-up combustor 50.

The air supply device 2 supplies air to the start-up combustor 50. The pump 40 supplies fuel to the start-up combustor 50 from the fuel tank 4. The start-up combustor 50 burns the supplied air and fuel to produce high temperature combustion gas and sends the combustion gas to the reformer 3. The heat of the combustion gas warms up the reformer 3 and the carbon monoxide oxidizer 7. To perform the warm-up, a valve 13 placed between the carbon monoxide oxidizer 7 and the fuel cell stack 1 is closed to prevent the combustion gas from flowing into the fuel cell stack 1.

During the warm-up, since the reformer 3 cannot produce reformate gas, the hydrogen storage device 14 supplies hydrogen to the fuel cell stack 1 via a valve 15 instead. The hydrogen storage device 14 comprises a hydrogen tank and a hydrogen indicator 61.

To control the warm-up operation of the reformer 3 and the carbon monoxide oxidizer 7, the fuel cell system comprises a controller 20. The controller 20 controls the valve 15 to regulate the flow rate of hydrogen that flows to the fuel cell stack 1 from the hydrogen storage device 14 during the warm-up of the reformer 3.

The controller 20 comprises one or more microcomputers having a central processing unit (CPU), a read-only memory (ROM), a random access memory (RAM), and an input/output interface (I/O interface).

To control the operation of the reformer 3, the controller 20 is connected to the reformer 3 by a signal circuit. To detect the hydrogen storage amount in the hydrogen storage device 14, the controller 20 is connected to the hydrogen indicator 61 by a signal circuit.

This fuel cell system further comprises a navigation system 31 that outputs information such as a vehicle running distance to the destination to the controller 20, and comprises a vehicle running distance input device 30 that outputs a distance to the destination arbitrarily inputted by the driver.

Figure 2:
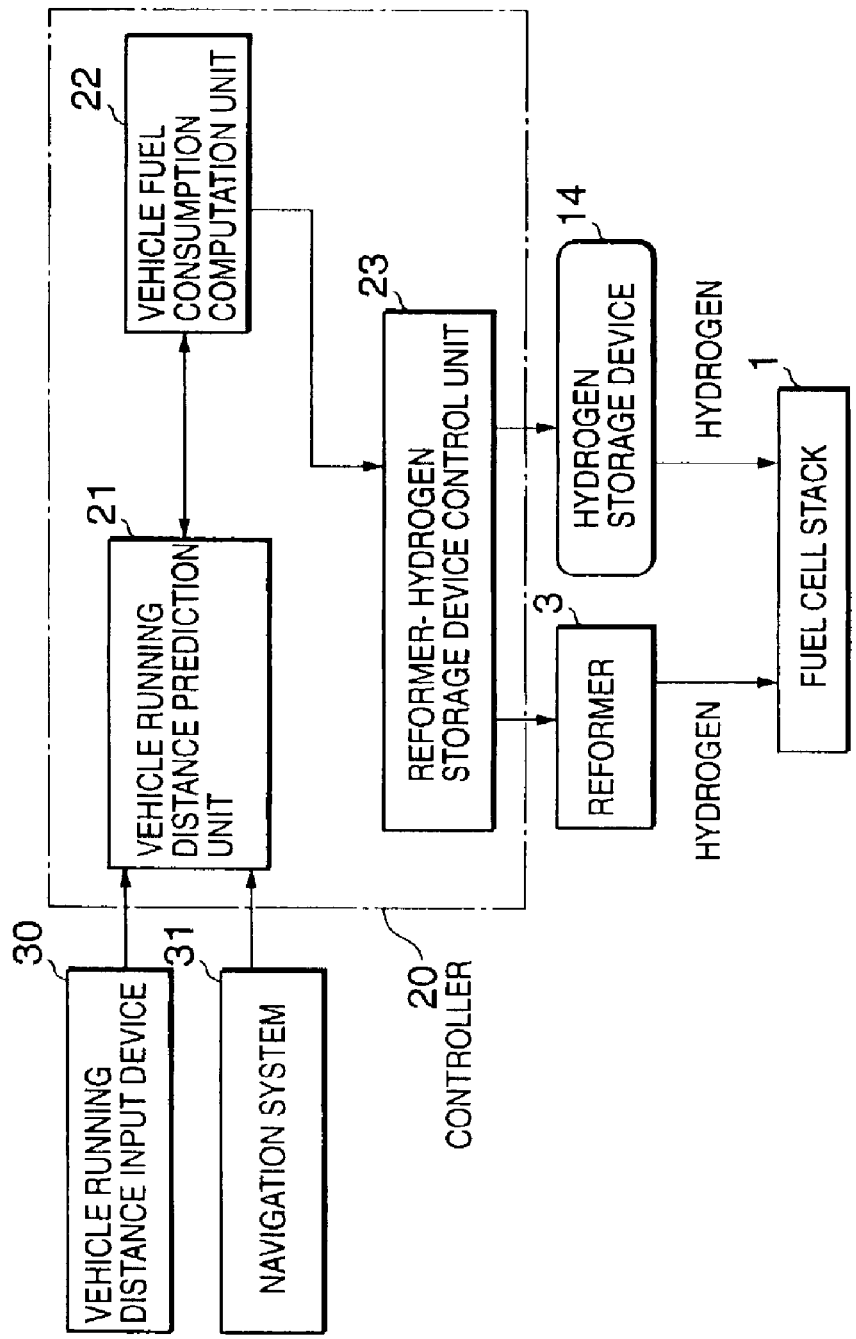
FIG. 2 is a schematic diagram of a controller according to this invention.

Referring to FIG. 2, the control performed by the controller 20 according to this invention will now be described.

The controller 20 comprises a running distance prediction unit 21, a fuel consumption amount computing unit 22, and a reformer-hydrogen storage device control unit 23.

Each of the above units is a virtual unit for describing the functions of the of the controller 20 and does not have a physical existence.

To obtain vehicle running distance information, the controller 20 is connected to the vehicle running distance input device 30 and the navigation system 31.

The vehicle running distance input device 30, to which the driver can directly input the vehicle running distance, outputs the input vehicle running distance information to the controller 20.

Alternatively, the driver can input the destination and the route through which the vehicle travels to the navigation system 31. The navigation system 31 calculates the prospective vehicle running distance based on the present vehicle position and the information inputted by the driver, and outputs the calculated distance to the controller 20. The navigation system 30 can output a prospective vehicle running time to the controller 20 calculated by taking the traffic jam information into account.

The vehicle running distance prediction unit 21 reads a signal from the navigation system 31 or vehicle running distance input device 30. When the vehicle running distance prediction unit 21 receives both signals from the navigation system 31 and the vehicle running distance input device 30, the vehicle running distance prediction unit 21 selects the signal from the vehicle running distance input device 30. The vehicle running distance prediction unit 21 sets the prospective vehicle running distance based on the inputted running distance information.

The fuel consumption amount computing unit 22 reads the amount of hydrogen storage in the hydrogen storage device 14 from the hydrogen indicator 61. Based on the read amount of hydrogen storage and the prospective vehicle running distance set by the vehicle running distance prediction unit 21, this unit computes the fuel consumption required to complete the travel based on various combinations of the operation mode of the reformer 3 and the hydrogen storage device 14. From among these combinations, the vehicle fuel consumption computation unit 22 selects one combination to minimize the fuel consumption for the drive.

Based on the operation modes selected by the fuel amount computing unit 22, the reformer-hydrogen storage device control unit 23 controls the reformer 3 and hydrogen storage device 14.

Figure 3:
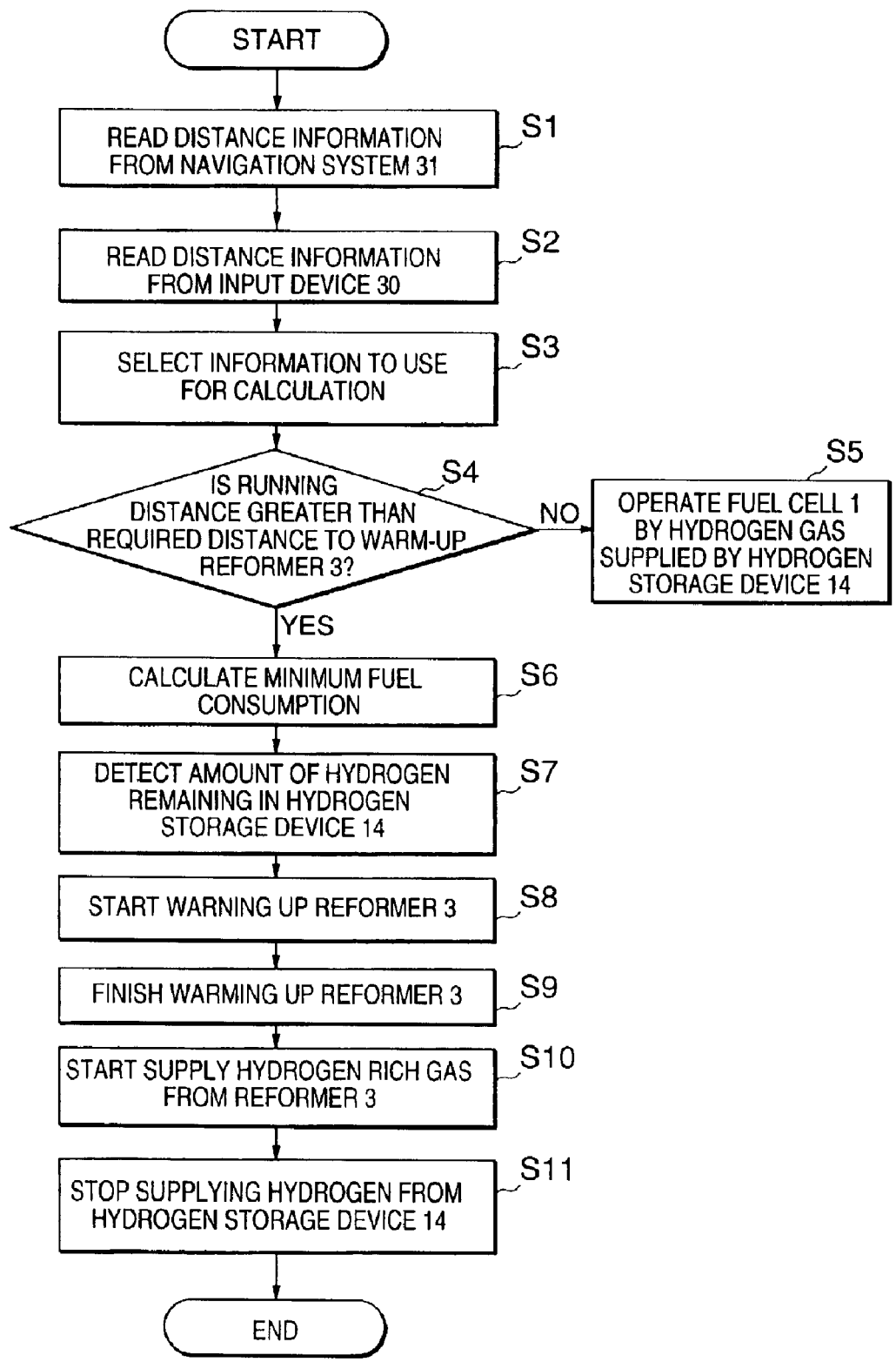
FIG. 3 is a flowchart describing a routine performed by the controller according to this invention.

Next, referring to FIG. 3, the routine performed by the controller 20 according to this invention will be described.

In a step S1, the controller 20 reads the distance calculated by the navigation system 31.

In a step S2, the controller 20 reads the distance information from the vehicle running distance information input device 30. The driver can decide whether or not to input the vehicle running distance into the vehicle running distance information input device 30.

In a step S3, the controller 20 sets the vehicle running distance information read from the vehicle running distance information input device 30 as the prospective vehicle running distance. If there is no signal from the vehicle running distance information input device 30, the vehicle running distance information calculated by the navigation system 30 is set to the prospective vehicle running distance. The controller 20 can also be programmed to take the traffic information or the driver's running patterns into account to calculate the prospective vehicle running time.

In a step S4, the prospective vehicle running distance is compared with the running distance required to complete the warm-up of the reformer 3. If the prospective vehicle running distance is shorter than the running distance required to complete the warm-up of the reformer 3, the routine proceeds to a step S5. On the other hand, if the prospective vehicle running distance is longer than the running distance required to complete the warm-up of the reformer 3, the routine proceeds to a step S6.

In the step S5, the controller 20 calls off the warm-up of the reformer 3 and closes the valve 13. At the same time, the controller 20 opens the valve 15 and starts hydrogen supply from the hydrogen storage device 14 to the fuel cell stack 1, so the fuel cell stack 1 can generate electric power. In this case, the fuel cell system 1 uses only the hydrogen supplied from the hydrogen storage device 14 until the vehicle finishes running without the operation of the reformer 3.

In a step S6, the controller 20 calculates the minimum fuel consumption amount required until the vehicle finishes running.

In a step S7, the controller 20 reads the amount of hydrogen storage in the hydrogen storage device 14 from the hydrogen indicator 61.

In a step S8, the controller 20 closes the valve 13 and starts the start-up combustor 50 to warm up the reformer 3. At the same time, the controller 20 opens the valve 15 to supply hydrogen from the hydrogen storage device 14 to the fuel cell stack 1 and to start electric power generation by the fuel cell stack 1.

In a step S9, the controller 20 assumes that the reformer 3 reached a predetermined temperature when a predetermined time passes from the start of the warm-up, and terminates the warm-up operation of the reformer 3.

In a step S10, the controller 20 stops the start-up combustor 50 and starts the reformer 3. At the same time, the valve 13 is opened to start the supply of the hydrogen-rich gas to the fuel cell stack 1.

Next, in a step S11, the controller 20 closes the valve 15 to stop the hydrogen supply from the hydrogen storage device 14.

The vehicle running distance prediction unit in the controller 20 performs the steps S3 and S4.

The fuel consumption amount computing unit in the controller 20 performs the steps S6 to S8.

The reformer-hydrogen storage device control unit in the controller 20 performs the steps S5, S9, and S10.

With this control, the operation of the reformer 3 and the operation of the hydrogen storage device 14 are optimized, so the fuel consumption of the fuel cell system is minimized.

Figure 4:
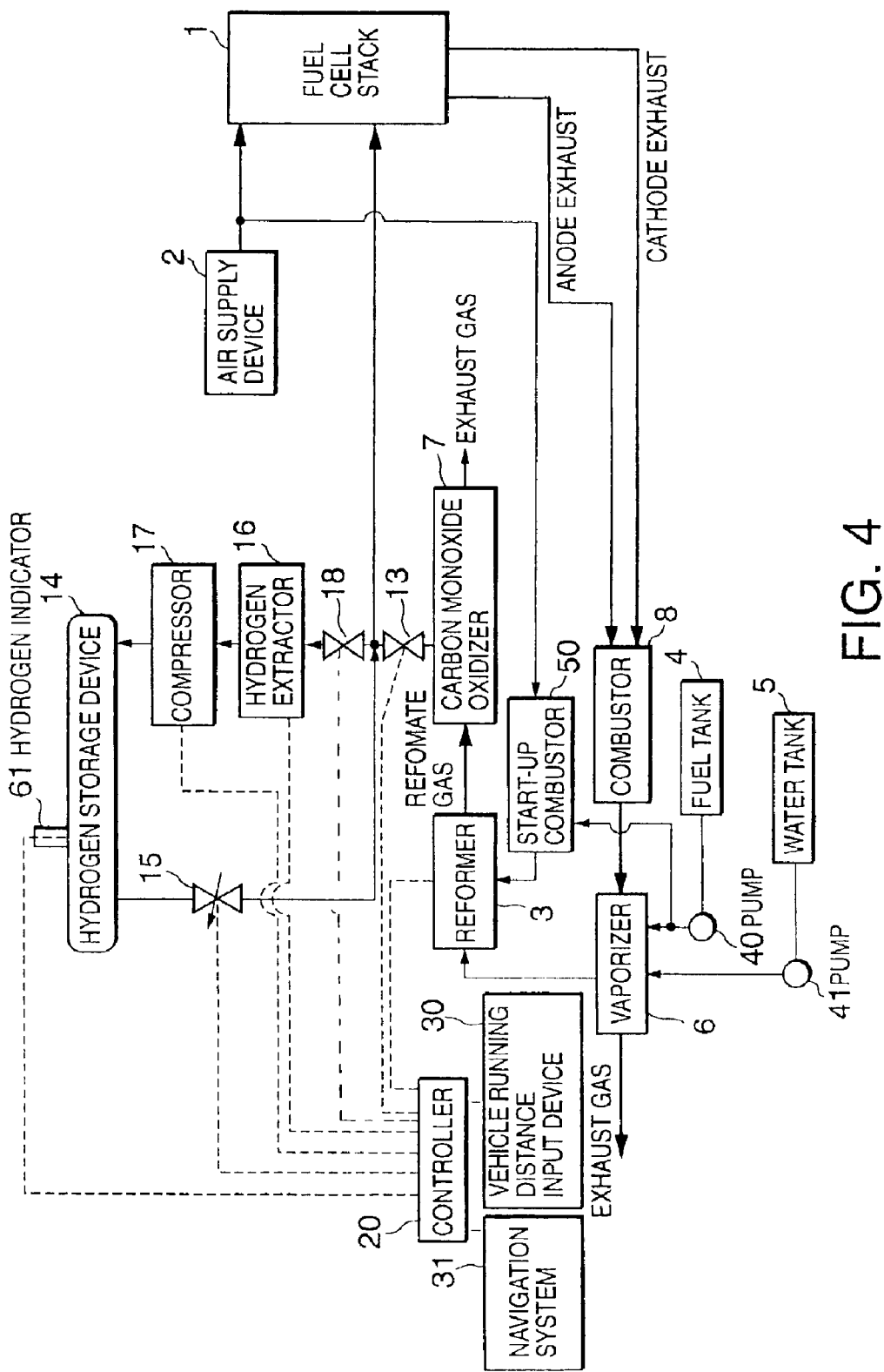
FIG. 4 is a schematic diagram of a fuel cell system for a vehicle according to a second embodiment of this invention.

A second embodiment of this invention will now be described referring to FIG. 4.

According to this embodiment, the fuel cell system further comprises a hydrogen extractor 16, a compressor 17, and a valve 18. The arrangement of the other parts of the system is same as in the first embodiment.

The carbon monoxide oxidizer 7 supplies a part of the generated hydrogen-rich gas to the hydrogen extractor 16. The hydrogen extractor 16 comprising a hydrogen permeable membrane extracts hydrogen from the hydrogen-rich gas and sends the extracted hydrogen to the compressor 17. The discharged gas after the hydrogen extraction is burnt together with the anode exhaust in the combustor 8. The compressor 17 compresses the extracted hydrogen to send it to the hydrogen storage device 14. The hydrogen storage device 14 stores the compressed hydrogen. This operation explained above is called "hydrogen storage running".

To perform a hydrogen storage running, the controller 20 opens a valve 18 and introduces hydrogen-rich gas to the hydrogen extractor 16.

If the reformer 3 is operated at high efficiency when the load on the fuel cell stack 1 is low, the reformer 3 produces more hydrogen-rich gas than the fuel cell stack 1 consumes. The system can use the excess hydrogen-rich gas by performing hydrogen storage running and storing hydrogen in the hydrogen storage device 14. Thus, a balance can be achieved between the generation and consumption of hydrogen-rich gas. Therefore, a high efficiency running of the reformer 3 can be maintained.

On the other hand, together with the hydrogen produced by the reformer 3, additional hydrogen is supplied to the fuel cell stack 1 from the hydrogen storage device 14 when the load on the fuel cell stack 1 is high. In this way, a high load that lowers the efficiency of the reformer 3 is prevented. Thus, the reformer 3 can be operated at high efficiency in a normal operation load.

With above control, the controller 20 can optimize the operation of the reformer 3 and the hydrogen storage device 14 to reduce the fuel consumption required for the drive. Further, since the hydrogen storage device 14 can store hydrogen during running, the capacity of the hydrogen storage device 14 can be reduced and the size of the hydrogen storage device 14 can be compact.

Figure 5:
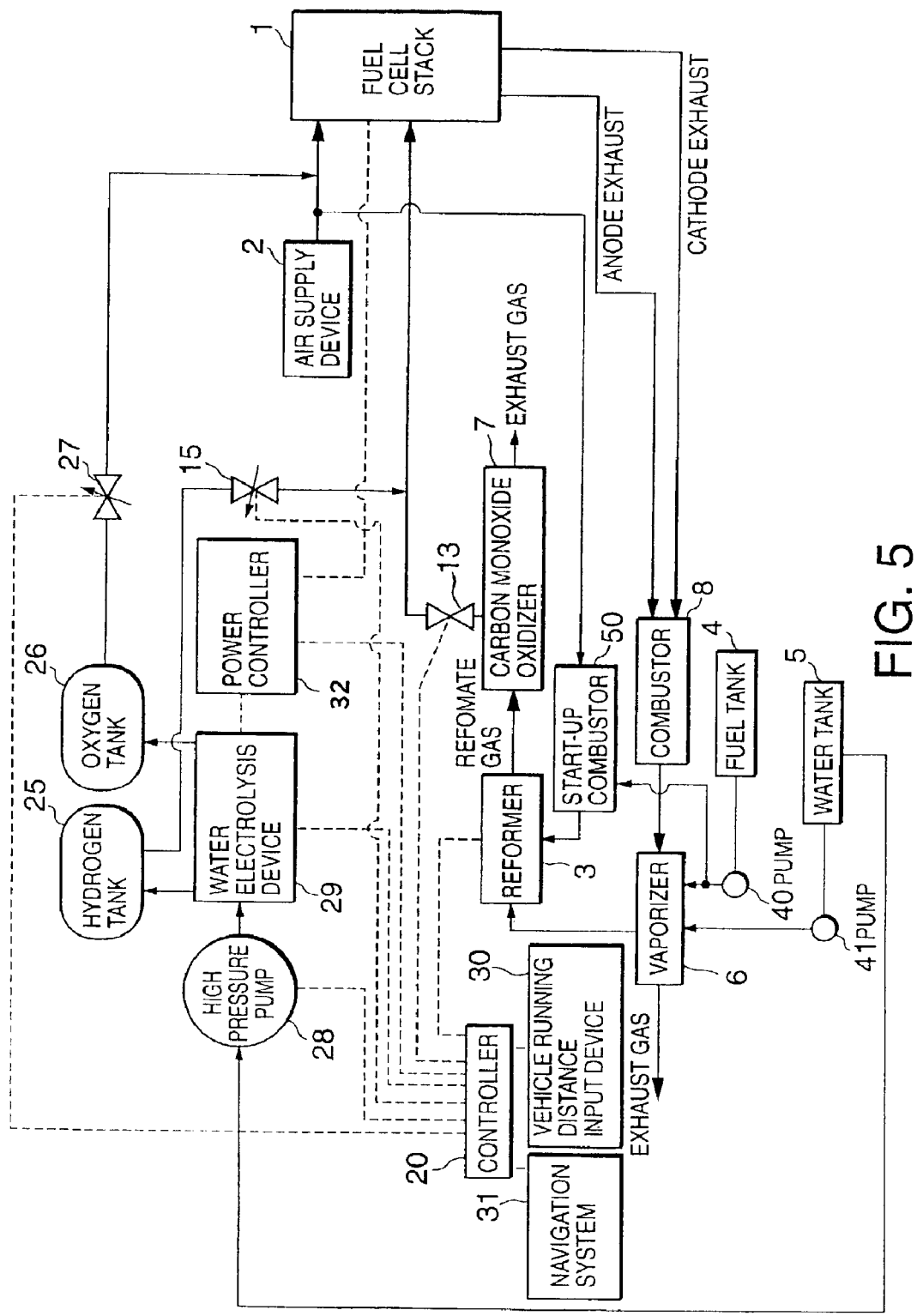
FIG. 5 is a schematic diagram of a fuel cell system for a vehicle according to a third embodiment of this invention.

Next, a third embodiment of this invention will be described referring to FIG. 5.

In this embodiment, the fuel cell system further comprises a hydrogen tank 25, an oxygen tank 26, a water electrolysis device 29, a high-pressure pump 28, a power controller 32, and a valve 27. The arrangement of the other parts of the system is same as in the first embodiment.

The high-pressure pump 28 pressurizes water from the water tank 5 and supplies it to the water electrolysis device 29. The power controller 32 distributes the electric power generated by the fuel cell stack 1 to the water electrolysis device 29. The water electrolysis device 29 electrolyzes the water supplied by the high-pressure pump 28 to generate hydrogen and oxygen by using the supplied power. The hydrogen tank 25 stores the generated hydrogen, and the oxygen tank 26 stores the generated oxygen.

If the reformer 3 is operated at high efficiency when the load on the fuel cell stack 1 is low, the reformer 3 produces more hydrogen-rich gas than the fuel cell stack 1 consumes. Therefore, the fuel cell stack 1 generates excess electric power to supply to the water electrolysis device 29 by using the excess hydrogen-rich gas. The water electrolysis device 29 uses the excess electric power to generate hydrogen and oxygen to be stored in the hydrogen tank 25 and oxygen tank 26. In this way, the system can balance the power generation with the power consumption, to be more specific, the hydrogen-rich gas generation with the hydrogen-rich gas consumption. Therefore, the high efficiency operation of the reformer 3 can be maintained.

On the other hand, when the running load is high, the controller 20 opens the valve 15 to supply the hydrogen to the fuel cell stack 1 from the hydrogen tank 25, in addition to the hydrogen produced by the reformer 3. Also, the controller 20 opens the valve 27 to supply oxygen to the fuel cell stack 1 from the oxygen tank 26, in addition to the oxygen in the fresh air supplied by the air supply device 2. In this way, a high load that lowers the efficiency of the reformer 3 is prevented. Consequently, the reformer 3 can constantly be operated in the high efficiency range during running of the vehicle.

With the above control, the fuel cell system can operate the reformer 3 at high efficiency. Thus, the efficiency of the fuel cell system can be improved, and the fuel consumption of the vehicle can be reduced.

Furthermore, when the load on the fuel cell stack 1 increases, the fuel cell stack 1 can quickly respond to the increase of load since the fuel cell stack 1 is directly provided with pure hydrogen and oxygen. The reformer 3 accompanies with a time lag in response. Thus, the response of the system becomes faster if the proportion of hydrogen supplied from the reformer 3 to the total required hydrogen decreases. Consequently, the controllability of the fuel cell system is improved.

Unlike the second embodiment in which the compressor 17 compresses the hydrogen gas to the storage pressure, the high-pressure pump 28 pressurizes the water to the storage pressure of the hydrogen tank 25 in this embodiment. As the pressurization efficiency is greater for the liquid than the gas, the power consumption is lower for the high-pressure pump 28 than for the compressor 17. Thus, the efficiency is improved for the fuel cell system of the third embodiment.

The entire contents of Japanese Patent Application P2001-155204 (filed on May 24, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel cell system for a vehicle comprising:
    a fuel cell that produces electricity by inducing a reaction between hydrogen and oxygen;
    a hydrogen generating device that generates hydrogen from liquid fuel;
    a warm up device that warms the hydrogen generating device when the fuel cell system is started;
    a hydrogen storage device that stores hydrogen;
    a valve that selectively connects either the hydrogen generating device or the hydrogen storage device to the fuel cell;
    an input device that input a vehicle running distance; and
    a programmable controller programmed to:
        compare the vehicle running distance to a predetermined distance; and
        if the vehicle running distance is shorter than the predetermined distance, prohibit the warm up device from warming the hydrogen generating device, and control the valves to connect the hydrogen storage device to the fuel cell.

2. The fuel cell system as defined in claim 1, wherein the controller is further programmed to, if the vehicle running distance exceeds the predetermined distance, control the valves to connect the hydrogen storage device to the fuel cell while the warm up device is warming the hydrogen generating device, until the vehicle complete to run the predetermined distance.

3. The fuel cell system as defined in claim 2, wherein the controller is further programmed to, after the vehicle completes to run the predetermined distance, control the valves to connect the hydrogen generating device to the fuel cell, and finish the warm up of the hydrogen generating device.

4. The fuel cell system as defined in claim 1, the fuel cell system further comprises a device that provides hydrogen produced by the hydrogen generating device to the hydrogen storage device.

5. The fuel cell system as defined in claim 1, the fuel cell system further comprises a device that separates water into hydrogen and oxygen by using electricity generated by the fuel cell, and a device that storages hydrogen and oxygen.

6. A fuel cell system for a vehicle comprising:
    a fuel cell that produces electricity by inducing a reaction between hydrogen and oxygen;

a hydrogen generating device that generates hydrogen from liquid fuel;

a warm up device that warms the hydrogen generating device when the fuel cell system is started;

a hydrogen storage device that stores hydrogen;

valves that selectively connects either the hydrogen generating device or the hydrogen storage device to the fuel cell;

an input device that input a vehicle running time; and a programmable controller programmed to:
  compare the vehicle running time to a predetermined time; and
  if the vehicle running time is shorter than the predetermined time, prohibit the warm up device from warming the hydrogen generating device, and control the valves to connect the hydrogen storage device to the fuel cell.

7. A fuel cell system for a vehicle comprising:

means for producing electricity by inducing a reaction between hydrogen and oxygen;

means for generating hydrogen from liquid fuel;

means for warming the hydrogen generating device when the fuel cell system is started;

means for storing hydrogen;

means for selectively connecting either the hydrogen generating device or the hydrogen storage device to the fuel cell;

means for inputting a vehicle running distance;

means for comparing the vehicle running distance to a predetermined distance; and means for if the vehicle running distance is shorter than the predetermined distance, prohibiting the warm up device from warming the hydrogen generating device, and controlling the valves to connect the hydrogen storage device to the fuel cell.

8. A control method for a fuel cell system of a vehicle, the fuel system having a fuel cell that produces electricity by inducing a reaction between hydrogen and oxygen, a hydrogen generating device that generates hydrogen from liquid fuel, a warm up device that warms the hydrogen generating device when the fuel cell system is started, a hydrogen storage device that stores hydrogen, a valve that selectively connects either the hydrogen generating device or the hydrogen storage device to the fuel cell, and an input device that input a vehicle running distance, the method comprises:

comparing the vehicle running distance to a predetermined distance; and if the vehicle running distance is shorter than the predetermined distance, prohibiting the warm up device from warming the hydrogen generating device, and controlling the valves to connect the hydrogen storage device to the fuel cell.

\* \* \* \* \*